United States Patent
Ciccone et al.

(10) Patent No.: US 11,396,117 B2
(45) Date of Patent: Jul. 26, 2022

(54) METHOD OF MANUFACTURING FOOTWEAR

(71) Applicant: Saucony, Inc., Waltham, MA (US)

(72) Inventors: Luca B. Ciccone, Leominster, MA (US); Andrea A. Paulson, Arlington, MA (US)

(73) Assignee: Saucony, Inc., Waltham, MA (US)

( * ) Notice: Subject to any disclaimer, the term of this patent is extended or adjusted under 35 U.S.C. 154(b) by 289 days.

(21) Appl. No.: 16/592,060

(22) Filed: Oct. 3, 2019

(65) Prior Publication Data

US 2021/0101321 A1 Apr. 8, 2021

(51) Int. Cl.
| | |
|---|---|
| *B29C 44/44* | (2006.01) |
| *B29C 35/04* | (2006.01) |
| *B29C 44/34* | (2006.01) |
| *B29C 44/18* | (2006.01) |
| *B29L 31/50* | (2006.01) |
| *B29K 105/04* | (2006.01) |

(52) U.S. Cl.
CPC .......... *B29C 44/445* (2013.01); *B29C 35/049* (2013.01); *B29C 44/18* (2013.01); *B29C 44/3426* (2013.01); *B29K 2105/048* (2013.01); *B29L 2031/504* (2013.01)

(58) Field of Classification Search
CPC ... B29C 44/445; B29C 44/343; B29C 35/049; B29C 44/3426; B29K 2105/048; B29L 2031/504
See application file for complete search history.

(56) References Cited

U.S. PATENT DOCUMENTS

| | | | |
|---|---|---|---|
| 5,366,674 | A | 11/1994 | Hattori et al. |
| 2011/0126428 | A1* | 6/2011 | Hazenberg ............. A43B 13/18 36/103 |
| 2013/0291409 | A1* | 11/2013 | Reinhardt ............ A43B 17/006 36/30 R |

(Continued)

FOREIGN PATENT DOCUMENTS

| | | |
|---|---|---|
| JP | 5138666 | 6/1993 |
| JP | 8155999 | 6/1996 |
| KR | 1020180034025 | 4/2018 |

*Primary Examiner* — Francisco W Tschen
*Assistant Examiner* — Elisa H Vera
(74) *Attorney, Agent, or Firm* — Warner Norcross + Judd LLP

(57) ABSTRACT

A method of manufacturing a footwear sole component is provided including projecting elongated pins into a mold cavity in the shape of the footwear sole component and partially filled with an expandable material including multiple unexpanded beads, and introducing steam into the cavity through ports defined by one or more cavity walls and through the pins in an internal region of the expandable material, to expand both exterior beads and interior beads in the internal region a predetermined amount. With the elongated pins, the interior beads can be expanded more, less and/or the same amount as exterior beads to provide particular physical characteristics to the component. For example, the interior beads can be fully expanded to a similar density as exterior beads, or expanded less to provide more density and rigidity in the internal region, or expanded more to provide less density and rigidity in the internal region.

20 Claims, 12 Drawing Sheets

(56) References Cited

U.S. PATENT DOCUMENTS

2014/0110491 A1* 4/2014 Roberts, Jr. ........... B29C 44/445
                                                      238/84
2015/0064379 A1   3/2015 Roberts
2017/0341327 A1* 11/2017 Le ........................ B29D 35/148
2020/0282886 A1* 9/2020 Fukuta ................. B60N 2/7017
2020/0359737 A1* 11/2020 Sung .................... A43B 13/145

* cited by examiner

METHOD OF MANUFACTURING FOOTWEAR

BACKGROUND OF THE INVENTION

The present invention relates to footwear, and more particularly to a method of manufacturing footwear by expanding certain materials to form a sole of the footwear.

Footwear constructions typically include an upper that envelops a wearer's foot and a sole assembly joined with the upper. The sole assembly forms a ground contacting, cushioning element. The sole assembly usually is constructed to include a soft, compressible midsole, mounted directly under the upper, and a more durable rubber outsole that directly engages an underfoot surface or terrain. The midsole is deliberately of a relatively low durometer to enhance cushioning and improve impact absorption.

For many years, soles and other cushion elements in footwear have been constructed from ethyl vinyl acetate (EVA) foam. EVA foam is durable, resilient, and provides decent impact absorption. In recent years, however, footwear manufacturers have turned to expanded thermoplastic polyurethane (eTPU) to manufacture sole components due to its softer yet still durable properties. eTPU sole elements are typically manufactured in a steam chest. In particular, unexpanded eTPU beads are deposited in a mold cavity. The mold cavity is closed, and high pressure steam is introduced into the mold cavity. As the material is introduced, the eTPU beads expand to fill the mold cavity. After the beads cure, the finished sole is removed from the mold.

An issue with steam chest molding is that the steam typically only expands well the beads with which the steam comes in contact. Thus, the beads on the outside of a mass of expandable beads come into good contact with the steam and therefore expand a desired amount. On the other hand, beads buried deep inside the mass do not expand well, or only expand partially because the steam does not contact them, or only imparts a low amount of energy to them via other adjacent beads. Thus, those interior beads remain wholly or partially unexpanded, in which case, more of those interior beads tend to agglomerate in an interior part of the sole. Where this occurs, that particular part of the sole becomes more dense with the unexpanded or only partially expanded eTPU beads. The sole in this region feels harder and less flexible as a result. Further, with exceptionally wide or thick soles, the unexpanded or partially expanded beads can be more prevalent, and can significantly affect the flexibility, comfort and functionality of the sole. Where the footwear is running or athletic footwear, the higher eTPU material density, due to the high number of partially or unexpanded beads, can increase the weight of the footwear, and thus prematurely fatigue the wearer.

Accordingly, there remains room for improvement in the field of forming footwear sole components to enhance and/or better control expansion of certain expandable materials that constitute those components.

SUMMARY OF THE INVENTION

A method of manufacturing a footwear is provided in which pins are projected into an interior of unexpanded but expandable material, a fluid is introduced both externally to the material by ports in the cavity and to an internal region of the material via the pins so that an internal region of the expandable material adequately expands and forms a footwear sole component, such as a midsole, footbed, insole, sockliner and/or outsole.

In one embodiment, the method can include projecting elongated pins into a mold cavity in the shape of a footwear sole component and partially filled with the expandable material including multiple unexpanded beads, and introducing fluid, in the form of steam, into the cavity through ports defined by one or more cavity walls, and through the pins in an internal region of the expandable material, to expand both exterior beads and interior beads in the internal region a predetermined amount.

In another embodiment, the method can include introducing a first fluid, which can be steam, into the first cavity through first ports defined by at least one of a lateral mold sidewall, a medial mold sidewall, a heel mold wall, a toe mold wall and a bottom mold wall of the first cavity. The first fluid can be introduced to expand exterior unexpanded beads, and can produce an inward force toward the internal region.

In still another embodiment, the method can include projecting the elongated pins through pin ports into the first cavity between the lateral mold sidewall and the medial mold sidewall, between the toe mold wall and the heel mold wall, and opposite a bottom mold wall. These pins can project into the internal region of the interior beads.

In yet another embodiment, the method can include introducing a second fluid, which can be steam, into the first cavity, and into the internal region via the elongated pins such that steam from the pins expands the unexpanded interior beads in the internal region and exerts an outward force, away from the internal region. The inward force produced by the first fluid can counter the outward force generally between the lateral wall and the medial wall, and between the toe wall and the heel wall.

In even another embodiment, the expanded exterior beads form at least one of a lateral sole sidewall, a medial sole sidewall, a toe wall, a heel wall, a sole bottom wall and a sole upper wall. The sole upper wall can be configured to engage a Strobel board of an upper. The elongated pins can extend through the sole upper wall. The pins can be retracted out of the sole upper wall formed via the plurality of exterior beads such that the plurality of pin exits out of the sole component through the sole upper wall.

In a further embodiment, the elongated pins can each be in communication with a hollow tube. Each hollow tube can be in common fluid communication with a pressurized vessel of the second fluid. The second fluid can travel through each hollow tube at a common pressure and temperature during the second fluid introducing step.

In still a further embodiment, the method can include retracting the elongated pins out of the sole upper wall in a heel region of the sole component. The heel region can include a heel thickness of at least 20 mm. Each of the pins can project into the first mold cavity less than 20 mm.

In even a further embodiment, the elongated pins are retracted from the sole upper wall in the heel region. The sole upper wall thereafter can define corresponding remnant deformations such as recesses, where the elongated pins were once located in the heel region. After a curing step, a Strobel board can be placed over the sole upper wall to conceal the remnant deformations.

The method of manufacturing footwear of the current embodiments provides a sole component having material that is satisfactorily expanded throughout the component. With the elongated pins, expandable interior beads can be expanded more, less and/or the same amount as expandable exterior beads to provide particular physical characteristics to the component. For example, the interior beads can be fully expanded via fluid from the pins to a similar density as exterior beads. This can provide uniform cushioning throughout the length and width of the sole component. The interior beads can be expanded via the fluid from the pins less than the exterior beads to provide more density and rigidity in the internal region. This can allow the component to be stiffened, strengthened or supported more in certain regions, to increase stability and/or support. The interior beads can be expanded more via fluid from the beads to provide less density and rigidity in the internal region. In some cases, the elongated pins can expand interior beads in an internal region a custom amount or in particular areas of the sole component to fine tune the sole component for a particular application.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF THE CURRENT EMBODIMENTS

Figure 1:
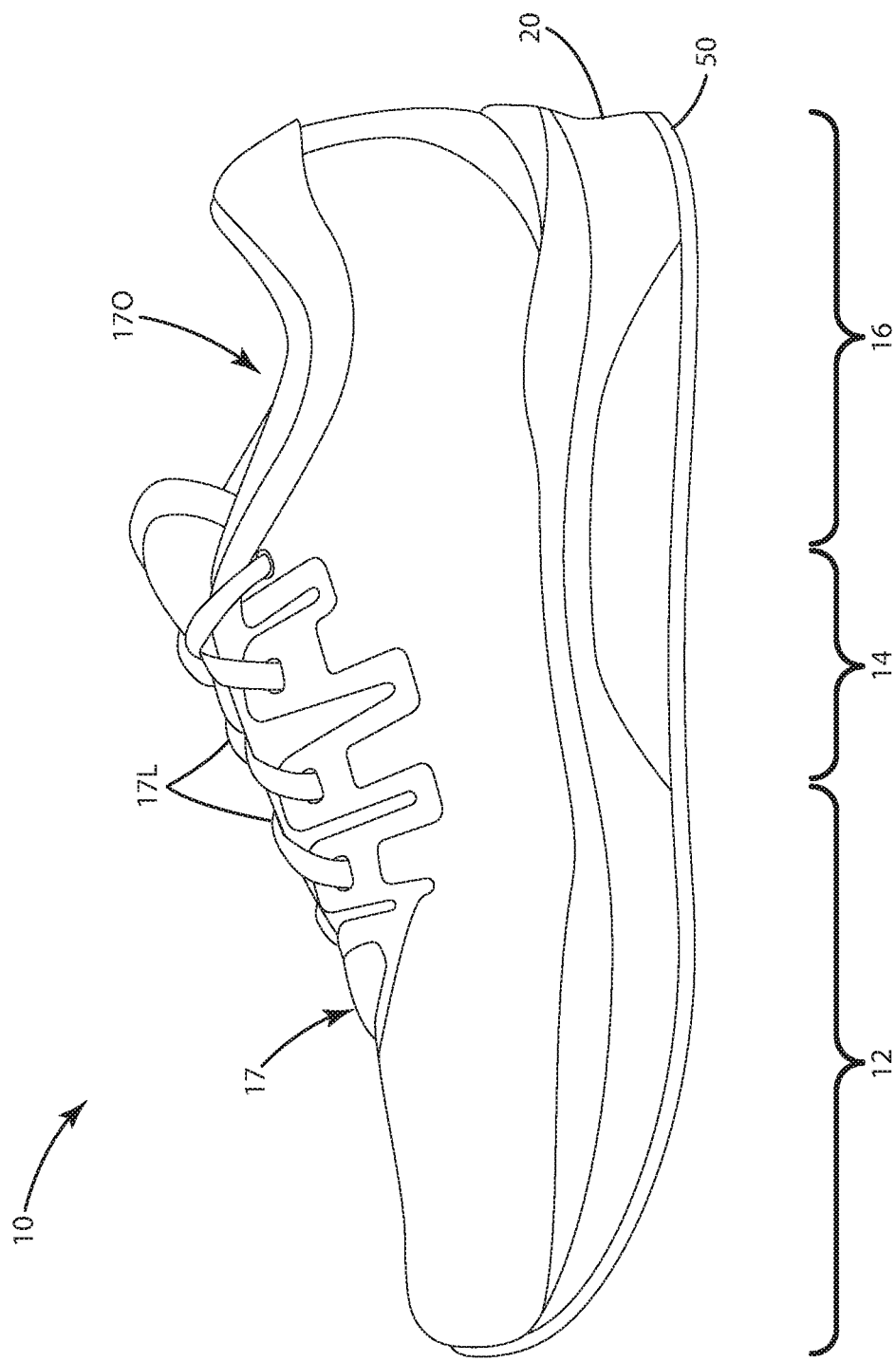
FIG. 1 is a side view of footwear with an associated sole component manufactured according to a method of a current embodiment.

A current embodiment of the footwear including a sole component manufactured according to a current embodiment is illustrated in FIGS. 1-11, and generally designated 10. The footwear can include a sole component 20, which is illustrated as a midsole, constructed from an expanded material, optionally in the form of expanded polyurethane (eTPU) beads. The sole component can be joined with an upper 17 and an underlying outsole 50. With the method herein, the expanded material in an internal region 30 can be expanded to a particular level, for example, the same as, less than or greater than, expanded material in an external region 40 of the sole component. On a high level, the method of manufacturing the sole component 20 can include introducing an expandable material EM including a plurality of unexpanded beads UXB into a first cavity 61C; projecting elongated pins 71 into the first cavity; introducing a first fluid S1 into the first cavity through first ports 61P; introducing a second fluid into the first cavity 61C via the pins 70; expanding the beads UXB with the first fluid and the second fluid to produce expanded beads XB that form at least one of a lateral sole sidewall, a medial sole sidewall, a toe wall, a heel wall, a sole bottom wall and a sole upper wall; removing the elongated pins 71 out of the first cavity 61C; and removing the cured sole component 20 from the first mold cavity 61C.

Although the current embodiment is illustrated in the context of manufacturing a running shoe, the method can be used to make a sole or other component of any type or style of footwear, including performance shoes, trail shoes and boots, hiking boots, work boots, all-terrain shoes, athletic shoes, cross trainer shoes, sneakers, conventional tennis shoes, walking shoes, multisport footwear, casual shoes, dress shoes or any other type of footwear or footwear components.

Figure 9:
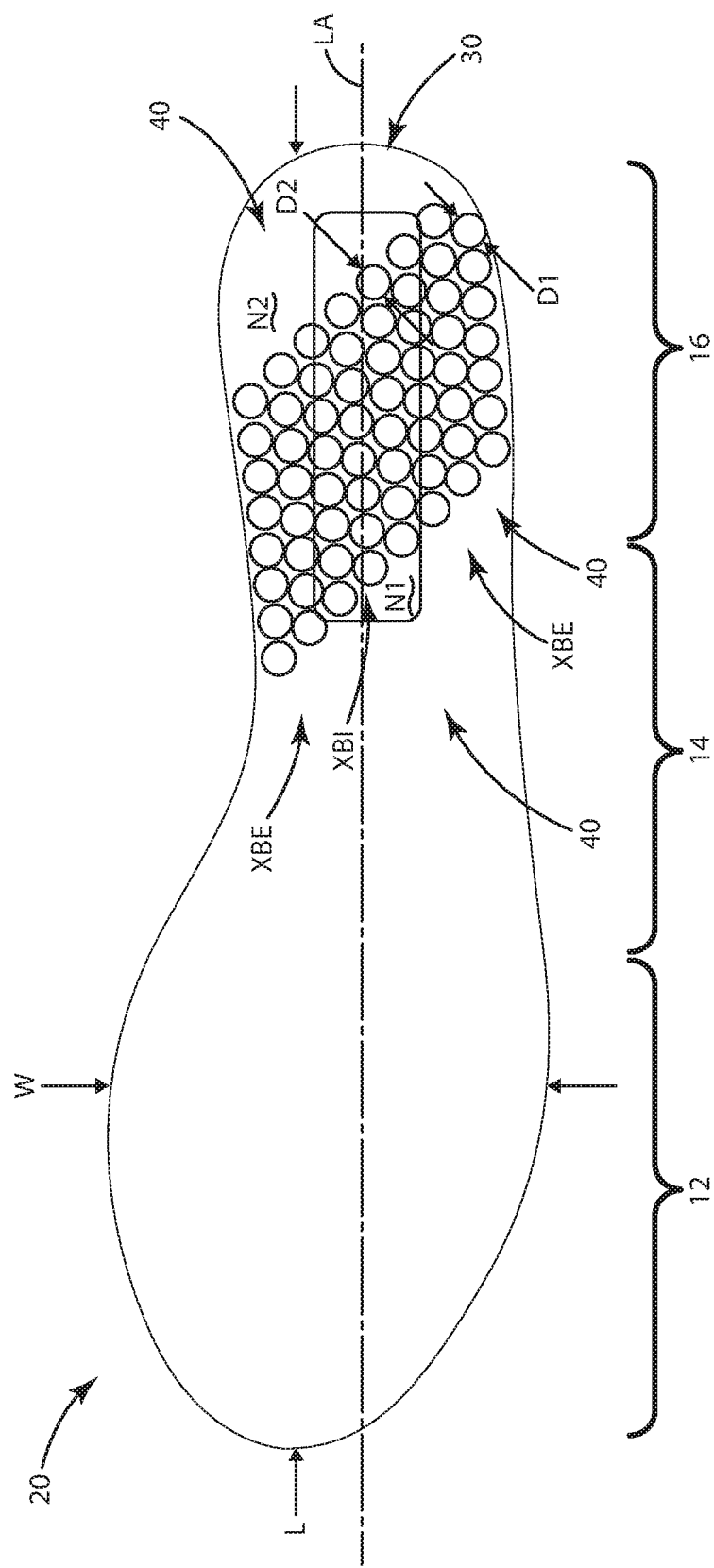
FIG. 9 is a top view of the sole component illustrating an internal region with interior beads expanded to a similar extent as exterior beads with the method herein.

It also should be noted that directional terms, such as "vertical," "horizontal," "top," "bottom," "upper," "lower," "inner," "inwardly," "outer" and "outwardly," are used to assist in describing the invention based on the orientation of the embodiments shown in the illustrations. Further, the terms "medial," "lateral" and "longitudinal" are used in the manner commonly used in connection with footwear. For example, when used in referring to a side of the shoe, the term "medial" refers to the inward side (that is, the side facing the other shoe) and "lateral" refers to the outward side. When used in referring to a direction, the term "longitudinal direction" refers to a direction generally extending along the length of the shoe between toe and heel, and the term "lateral direction" refers to a direction generally extending across the width of the shoe between the medial and lateral sides of the shoe. The use of directional terms should not be interpreted to limit the invention to any specific orientation. Further, as used herein, the term "arch region" (or arch or midfoot) refers generally to the portion of the footwear or sole assembly corresponding to the arch or midfoot of the wearer's foot; the term "forefoot region" (or forefoot) refers generally to the portion of the footwear forward of the arch region corresponding to the forefoot (for example, including the ball and the toes) of a wearer's foot; and the term "heel region" (or heel) refers generally to that portion of the footwear rearward of the arch region corresponding to the heel of the wearer's foot. The forefoot region 12, arch region or mid-foot region 14, and heel region 16 generally are identified in FIG. 1. However, it is to be understood that delineation of these regions may vary depending upon the configuration of the sole assembly and/or footwear. The sole assembly 20 can include a side-to-side width W, a heel-to-toe longitudinal length L and a longitudinal axis LA, which can be shared with the footwear, sole assembly, and other components as illustrated in FIG. 9.

Certain first S1 and second S2 fluids are described herein and introduced into the first cavity via different pins and ports. These fluids optionally can be in the form of steam, which can be a gas phase of water, which may or may not include water vapor or droplets. These fluids optionally can be in the form of a high pressure mist or aerosol of water or other liquid droplets or molecules. The fluids can be at common pressures and temperatures when introduced into the first cavity 61C as described below. Indeed, each of the fluids introduced can be a common, same fluid, and can come from a common pressurized vessel 69 plumbed to the elongated pins 71 and first ports 61P, with which those elements are in fluid communication and connected. The first and second fluids introduced into the first cavity in the method herein can be optionally at a pressure of at least 2 bar, at least 3 bar, at least 4 bar, at least 5 bar, between 1 bar and 10 bar, inclusive, between 1 bar and 5 bar, inclusive, or between 2 bar and 5 bar, inclusive. The first and second fluids introduced into the first cavity in the method herein can be optionally at a temperature of at least 100° C., at least 150° C., at least 200° C., between 90° C. and 200° C., inclusive, between 80° C. and 250° C. inclusive.

Figure 10:
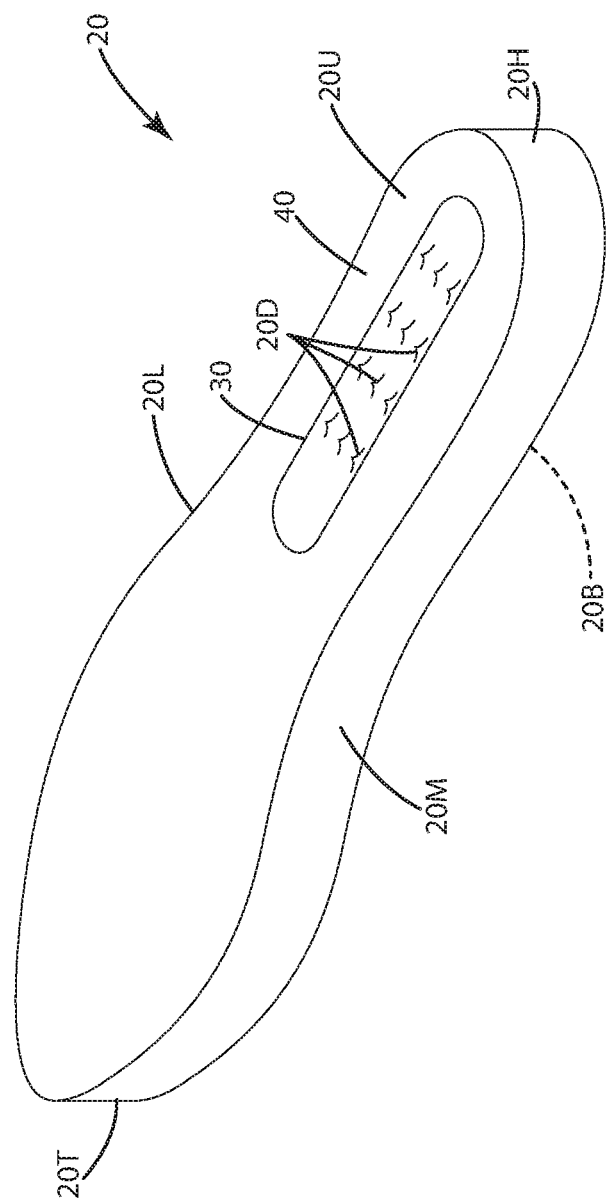
FIG. 10 is a top perspective view of the sole component with the remnant deformations in the sole upper wall.
Figure 11:
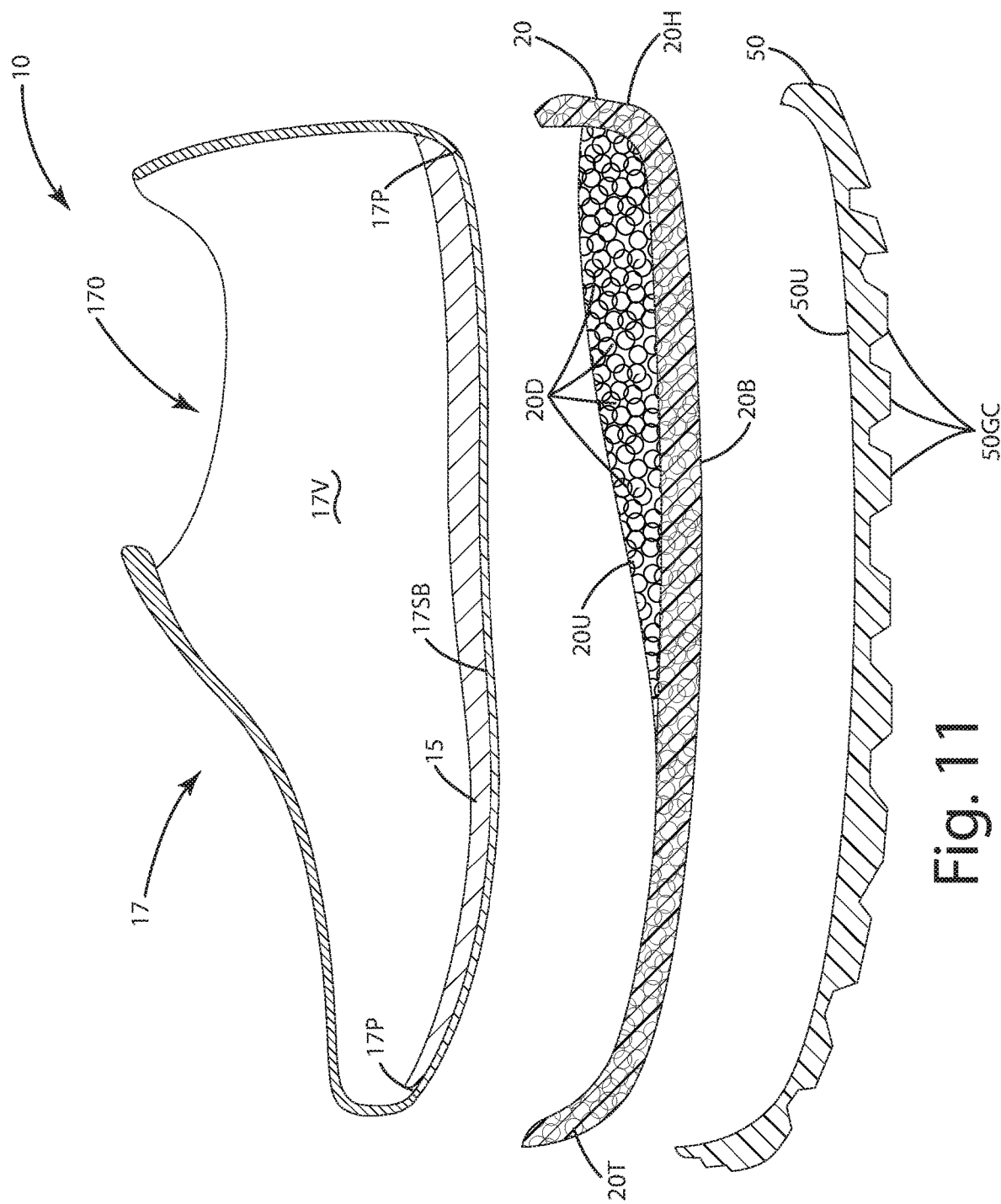
FIG. 11 is a side section view of the sole component being attached to an upper and a Strobel board, along with an outsole.

Turning to FIGS. 1, 10 and 11, the other components such as the outsole 50 and upper 17 will be briefly described. The outsole 50, can include a lowermost or ground contacting surface 50GC, and can include multiple lugs, treads, spikes, cleats and/or other features designed to enhance traction between the footwear and an underlying surface. Where present, the lugs and treads can be arranged as desired, and not necessarily in a repeating pattern. The lugs and treads can include one or more geometric shapes. The outsole tread can be constructed from one or more materials, for example, natural and/or synthetic rubber, thermoplastic polyurethane elastomers (TPU), nylon, polymer blends, wear resistant polymers, elastomers and/or other materials. Other materials, such as fiber-reinforced polymers can be used, which can include epoxy, polyethylene or thermosetting plastic. The outsole material can have a durometer, optionally about 40 Shore A to about 70 Shore A, further optionally about 68 Shore A to 72 Shore A.

As mentioned above and shown in FIGS. 1 and 11, the footwear 10 can include an upper 17 joined with the sole component 20. The upper can be formed from a variety of material elements joined together to cover at least a portion of the wearer's foot. The material elements can be selected based on the intended uses of the article of footwear 10, and can include synthetic textiles, mesh textiles, canvas polymers or leather, for example. The upper 17 can define an upper opening 17O for receiving the wearer's foot. The opening 17O can provide access to the void 17V inside the upper, where a wearer's foot can be positioned. The upper can include one or more closure elements, for example, laces 17L.

A footbed or sock liner 15 can be positioned within a foot void defined by the upper and can be non-stretchable and lightweight and joined to the upper to provide a void for receipt of the wearer's foot. The footbed can be constructed from a molded material, such as EVA foam, PU, latex, gel or other materials, and by virtue of its compressibility, provide cushioning, and may also conform to the foot in order to provide comfort, support, and stability. The upper 17 can include a lower peripheral allowance or edge 17P that can be stitched, cemented, or otherwise fastened to the footbed around the perimeter of the footbed. The upper can include a Strobel board 17SB, which can be attached to the peripheral allowance 17P. The joining of the sole component and the upper can be accomplished using adhesives, cement, injection molding, pour molding or any other technique used to join an upper and sole assembly.

With reference to FIGS. 1 and 11, the sole component 20 can as mentioned above be attached to the outsole 50 and the upper 17. The sole component, which as shown in those figures is a fully cured component constructed according to the method herein, is again shown as a full length midsole, which extends throughout the heel, arch and forefoot regions of the footwear, and further extends the entire width W and the entire length L of the footwear. The current methods herein, however, can be used to manufacture a variety of other sole components, such as an outsole, an insole, a footbed, a sock liner and/or partial versions of all of the foregoing. For example, the method can be used to make a heel pod sole component that only extends in the heel region 16. As another example, the method can be used to make a sole component that only extends part of the width, or part of the length in the arch region. A variety of other types of sole components also can be made with the current methods.

Turning now to the method of the current embodiments, reference is made to FIGS. 2-11. The method can be carried out utilizing a mold 60. The mold can include a first mold part 61 and a second mold part 62. The first mold part 61 can define a first mold cavity 61C. The first cavity 61C can be bounded by one or more mold walls, which are generally referred to as a first mold wall. These one or more mold walls can correspond to various walls of a sole component. For example as shown in FIG. 10, the sole component 20 can include a lateral sole wall 20L a medial sole wall 20M a toe wall 20T, a heel wall 20H a bottom sole wall 20B and a sole upper wall 20U. The mold 60 can include a lateral mold wall 61L, a medial mold wall 61M, a toe mold wall 61T, a heel mold wall 61H a bottom mold wall 61B and an upper mold wall 61U, corresponding to the walls of the sole component 20. The lateral mold wall, medial mold wall, toe mold wall, heel mold wall and bottom mold wall can be incorporated into the first mold part 61. Optionally, the upper mold wall 61U, and upper portions of the lateral and medial mold walls, can be incorporated into second mold part 62. Collectively, the one or more mold walls define a cavity corresponding to a portion of a shape of the sole component 20. Of course, where the sole component is not configured to extend a full length L or full width W of the footwear, one or more of these walls can be altered or deleted from the mold. For example, where the sole component forms merely a heel cushion, the toe mold wall can be deleted in the heel region 16. Where the sole component 20 forms only a portion that extends under the forefoot 12, the heel wall 61H can be deleted or simply moved forward. A variety of different mold wall configurations are contemplated to form various shaped sole components that may or may not form will be in the shape of a complete foot shaped outline.

The first mold part 61 can include multiple first ports 61P that are defined in one or more mold walls. For example multiple first ports 61P can be defined in any one of the lateral mold wall, the medial mold wall, the toe mold wall, the heel mold wall and/or the bottom wall. These ports 61P can be in fluid communication with a supply of fluids. The supply of fluid can be stored in a pressurized vessel 69 that holds the fluid at a particular temperature and pressure. As mentioned above, the fluid can be steam and can be at the temperatures and pressures that are indicated above. The pressure, temperature and amount of fluid delivered through the first ports can be regulated by a valve, controller or other similar device 69B interposed between the pressurized vessel 69 and the ports 61P. The first ports generally can be configured in multiple locations along the respective mold walls. The locations can be selected to adequately present enough of the fluid, for example steam, into the mold to engage and expand expandable material, for example, within the first mold cavity 61L.

Figure 4:
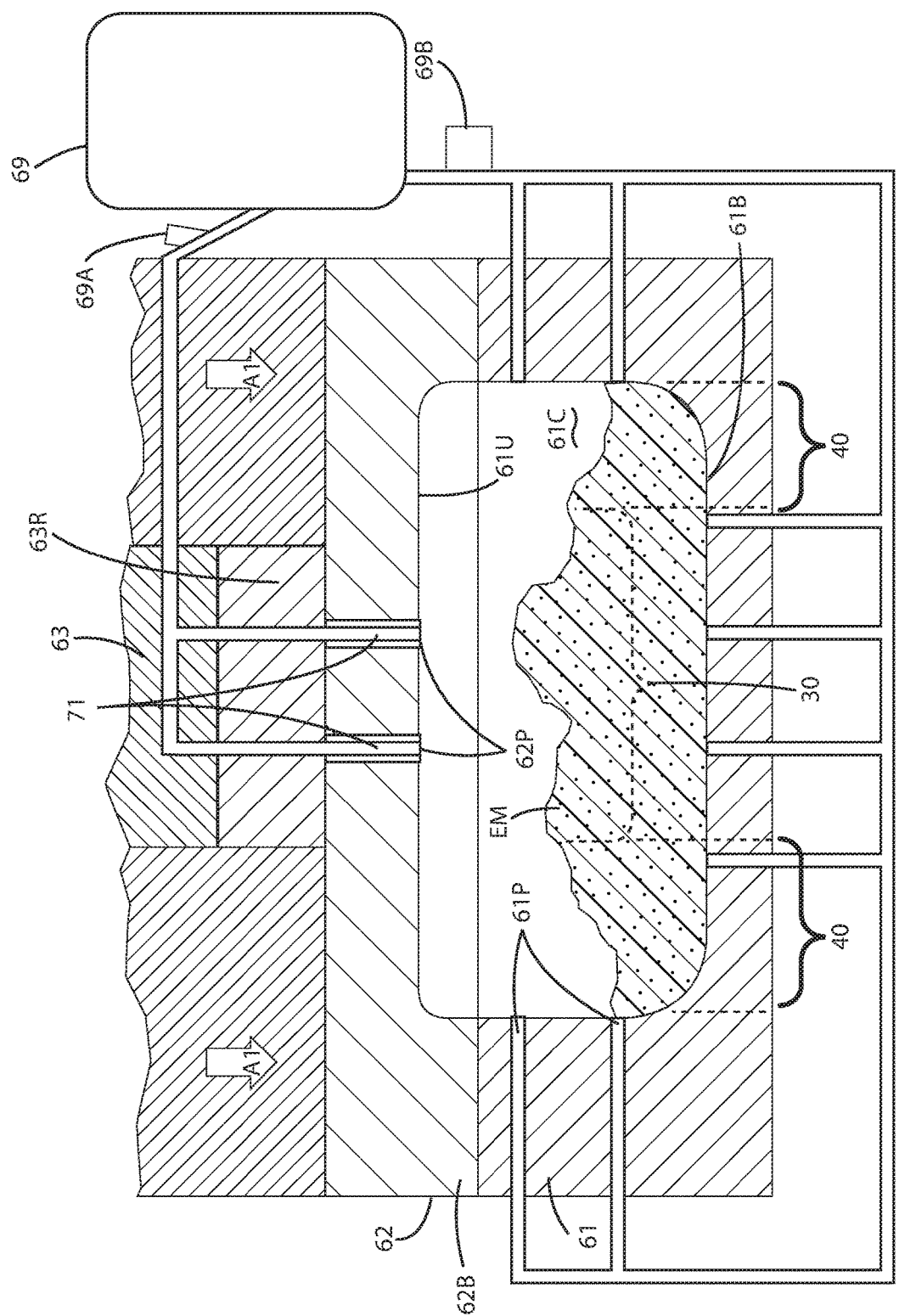
FIG. 4 is a section view of the mold used to manufacture the sole component, illustrating the second mold part adjacent the first mold part to close the first cavity, with elongated pins in a retracted state relative to the first cavity.

The mold 60 can include a second mold part 62. The second mold part 62 can include multiple elongated pins 71 that are configured to selectively extend into the interior of the first mold cavity 61C a predetermined amount. For example, as shown in FIG. 4, the second mold part 62 can include a base 62B that directly engages a portion of the first mold part 61. The base 62B can define a portion of the first mold cavity 61C, and optionally forming and including the upper mold wall 61U. The base 62B also can define a plurality of pin ports 62P. The pin ports 62P can be formed in the upper mold wall 61U and defined thereby. The pin ports can be in fluid communication with the cavity 61C. The pin ports 62P can be sized and dimensioned to receive respective pins 71, which can slide reciprocally through the ports.

Figure 2:
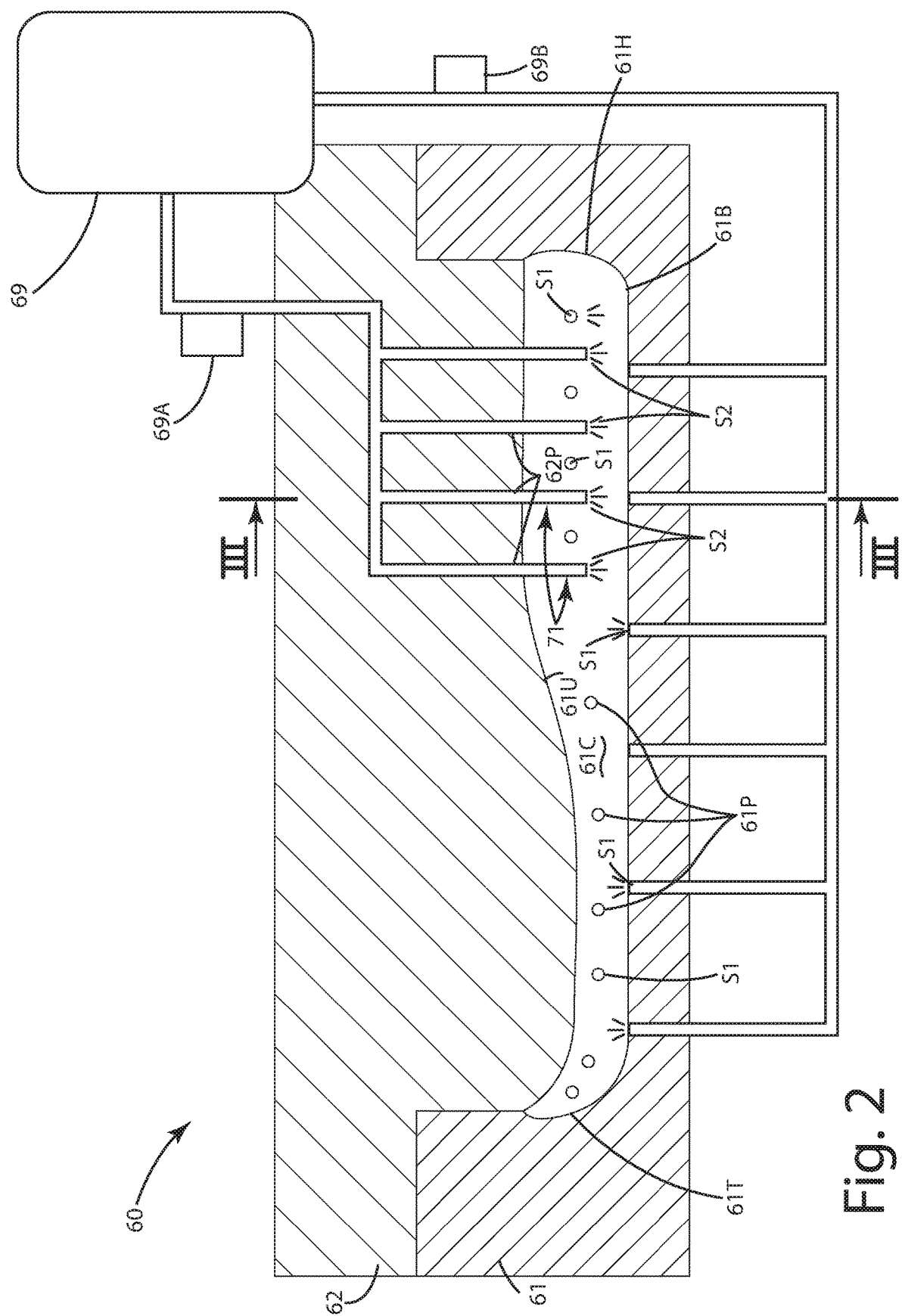
FIG. 2 is a section view of a mold used to manufacture the sole component, illustrating certain elongated pins that project into a closed, empty mold cavity.

Optionally, in alternate configurations, such as that shown in FIG. 2, the elongated pins 71 can extend through the pin ports 62P in a fixed permanent manner, can be non-slidable relative to the ports and can move with the second mold port 62. Returning to FIG. 4, the elongated pins 71 can be mounted fixedly to a movable mold part 63 and can move with that mold part 63. The mold part 63 can be mounted in a recess 63R and can move linearly toward and away from the mold cavity 61C, and directions A1 and A2. When the movable mold part 63 moves in direction A4 in the recess (FIG. 5), it moves the associated pins 71 through the pin ports 62P and introduces those pins into the first cavity 61C to a particular region of expandable material EM.

Figures 5, 6:
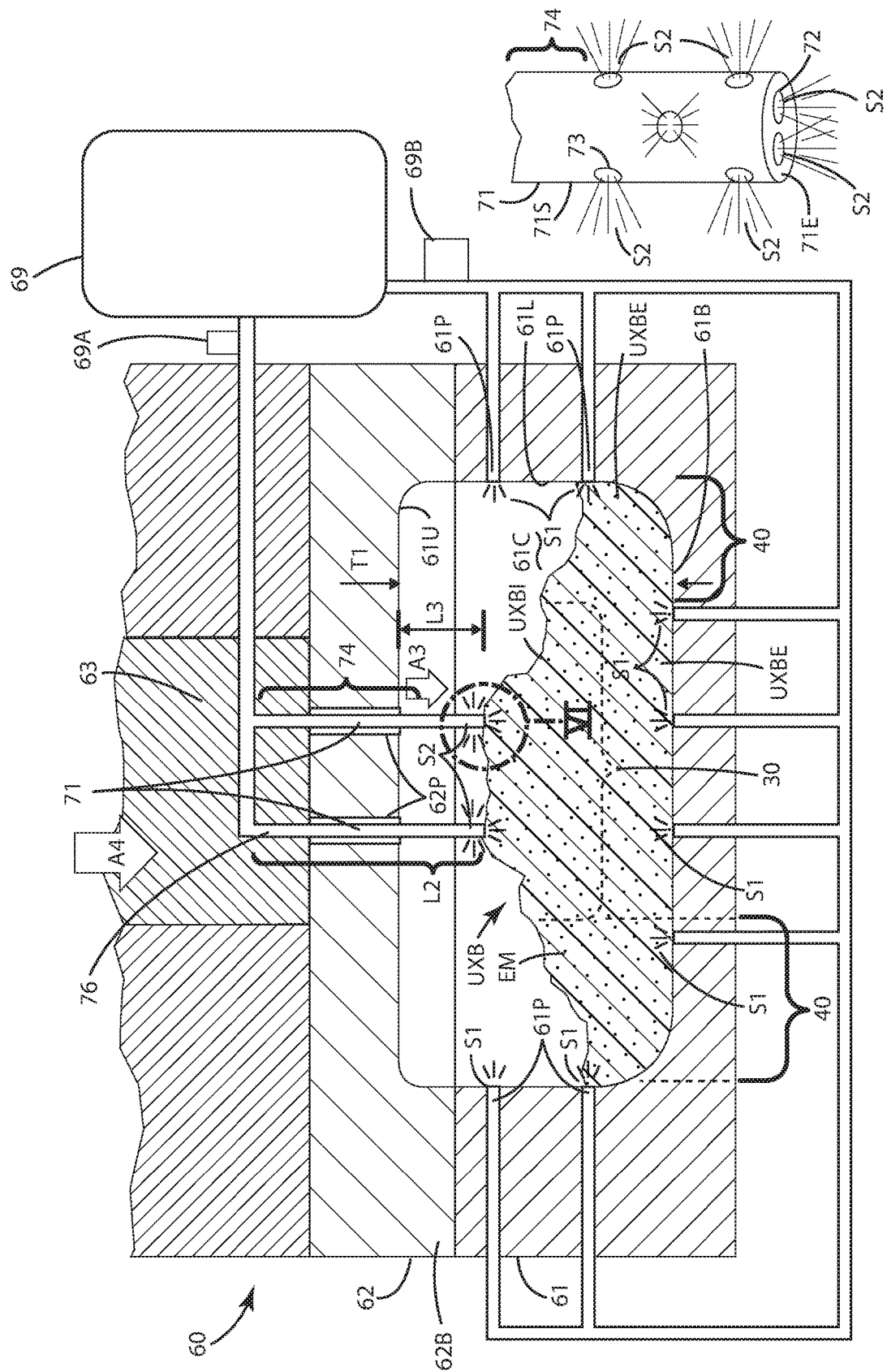
FIG. 5 is a section view of a mold used to manufacture the sole component, illustrating the elongated pins projecting into the closed first cavity.
FIG. 6 is a close up view of an elongated pin defining a distal aperture and pin sidewall apertures.

Each of the elongated pins 71 can be configured in a particular manner and can project into the cavity 61C a preselected amount. An exemplary elongated pin 71 as shown in FIG. 6. There, the pin 71 can include a pin end 71E. The pin end can include at least one distal pin end aperture 72. The pin also includes a sidewall 71S. The pin can form a tube, which can be hollow. Although shown as cylindrical, the pins can be of a variety of different cross-sectional shapes, for example, polygonal, rounded, square or others. Each of the hollow tubes or pins can be in common fluid communication with the pressurized vessel 69 of fluid, which again optionally can be in the form of steam as described above. The pin sidewall 71S can define multiple pin sidewall apertures 73. The distal aperture and the pin sidewall apertures can be configured such that the second fluid S2 can exit those apertures under pressure. The individual pins 71 also can be configured such that they include a non-aperture portion 74 that can be distal from the distal end 71E. The non-aperture portion 74 can be void of any apertures in the sidewall 71S. The non-aperture portion can be configured such that it is adjacent the first ports 62P when the elongated pins 71 introduce the second fluid into the void cavity 61C and/or the expandable material EM. In this manner, the steam 52 is not wasted, blowing into regions when there is no expandable material. The nonaperture portion also can be adjacent or in the upper sole wall. Accordingly, steam 52 under pressure does not excessively blow out the pins and make large holes in the upper wall 20U by pushing/blowing the beads away from the pin in the nonaperture portion.

As shown in FIG. 5, each of the pins 71 also can be of a particular length L2 configured so that a portion 76 of the pin remains outside of the first cavity 61C located within the respective ports 62P. This portion 76 of the pin is not introduced into the cavity 61C, even as the steam is introduced into the cavity 61C. Another portion 77 of the pin can extend fully into the cavity 61C. This portion 77 can be the portion of the pin that is disposed within the cavity when the movable mold part 63 is disposed closest to the base 62B of the second mold part 62. The portion 77 of the pin in the cavity can extend a length L3 into the cavity. This length L3 can optionally be a proportion of the thickness T1 of the cavity 61C defined by the mold 60. This thickness T1 also can correspond generally to the thickness of the finished sole component 20 from its upper sole wall 20U to its bottom sole wall 20B. The pin can extend into the first cavity different lengths and amounts, depending on the thickness of the cavity where the pins are introduced into the cavity and the overall expansion of the expandable material to be performed by the steam S2 from the pins 71.

Optionally, the pins can extend into the first mold cavity at least 10%, at least 15%, at least 20%, at least 25%, at least 30%, at least 35%, at least 40%, at least 45%, at least 50%, at least 75% of the thickness T1 as the second fluid is introduced through the pins. Further optionally, the one or more of the pins can project into the first mold cavity 61C a length L3 that is optionally less than 40 mm, less than 30 mm, less than 20 mm or less than 10 mm. Further optionally the heel region 16 of a cured sole component 20 can have a thickness of at least 10 mm, at least 20 mm, at least 30 mm or at least 40 mm.

Figure 3:
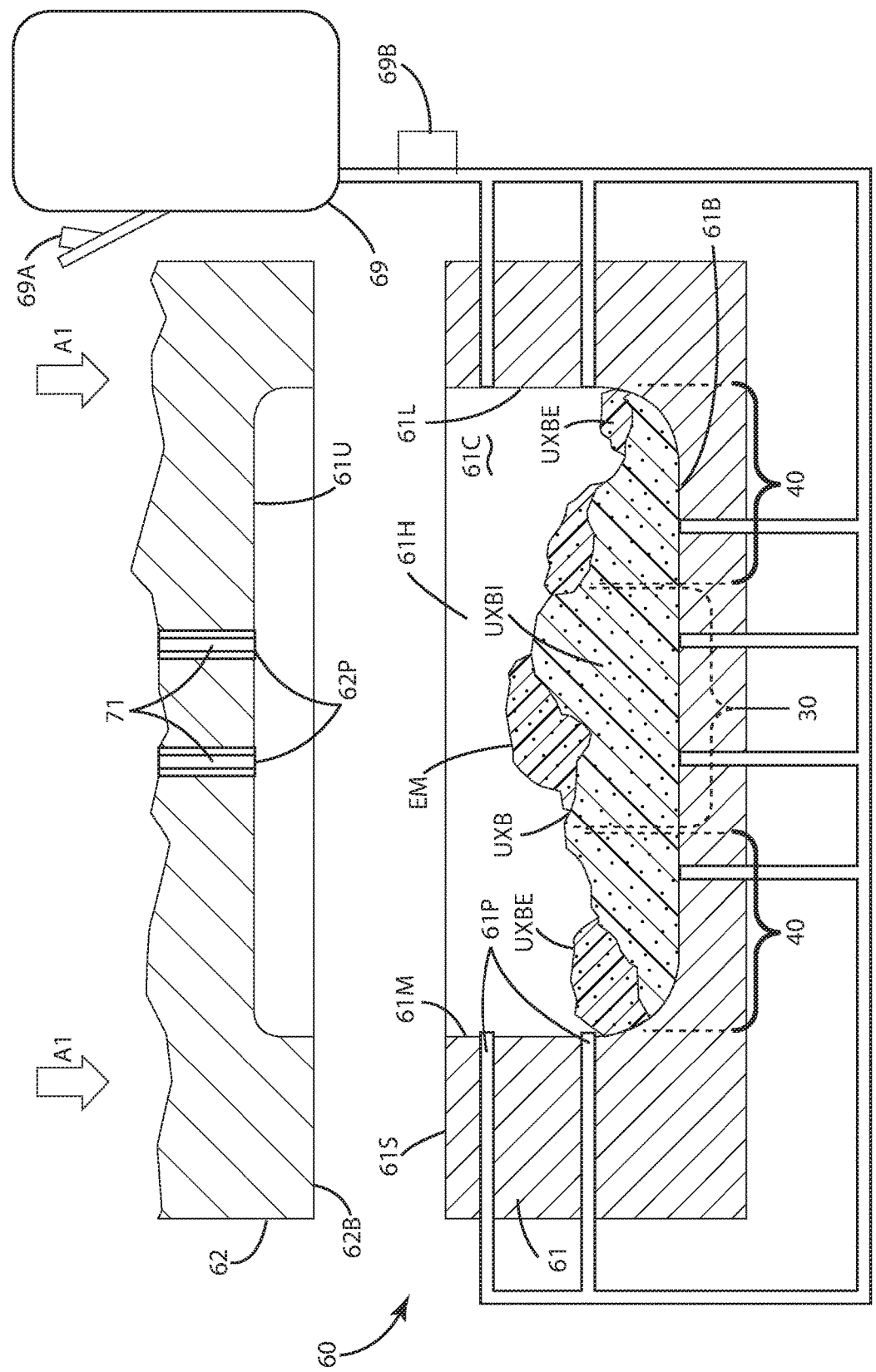
FIG. 3 is a section view of the mold used to manufacture the sole component, illustrating a second mold part being moved toward a first mold part defining a first cavity, taken for example along line III-III in FIG. 2.

With reference to FIGS. 3-8, the mold 60 can facilitate performance of the method. As shown in FIG. 3, the second mold part 62 can be located distal from the first mold part 61. An expandable material EM can be introduced into the first cavity 61C while the cavity is partially open as illustrated there. This expandable material can be in the form of eTPU, expandable polystyrene, expandable polypropylene, an expandable polymer, or any expandable material that is expanded due to the introduction of fluid, steam or gas in proximity to the expandable material. As shown, the expandable material can include eTPU beads. These beads can include unexpanded beads UXB. When introduced into the first cavity 61C, a plurality of exterior unexpanded beads UXBE can engage one or more of the walls, for example the lateral mold wall 61L, the medial sidewall 61M, the toe wall 61T, the head wall 61H and/or the bottom wall 61B. Interior unexpanded beads UXBI, however, are distal from that first mold wall and disposed generally in an internal region 30, which is located inward from the walls a preselected distance. As will be noted, this internal region can change and be altered in size and shape from the state when the expandable material is unexpanded, to the state when the expandable material is expanded. Generally, the internal region is located inward from the respective mold walls and inward from the corresponding walls of the finished sole component as described below.

Optionally, as shown, the internal region 30 can be disposed in the heel region 16 of the sole component 20. This can be the case where the sole component has an exceptionally large thickness T1 such that simple application of steam from the mold walls will not expand all of the interior unexpanded beads UXBI there. Of course, the internal region 30 can be located in other locations, such as the arch region 14 and/or the forefoot region 12, depending on the application. In these cases the pins 71 can be moved and can project into these respective regions to introduce the second fluid to expand the interior beads therein.

Returning to FIG. 4, after the expandable material EM is placed in the first mold cavity 61C, the second mold part 62 can be placed adjacent the first mold part 61 to close the first mold cavity 61C. The base 62B as mentioned above can include an upper mold wall 61U that corresponds to an upper surface 20U of the sole component 20. When the base and second mold part are moved in direction A1, they can contact the surface 61S of the first mold part and come to rest against it, closing the cavity 61C. In this condition, the pins 71 are not yet projected through the pin ports 62P the movable part 63 is in an upper portion of its stroke in the recess 63R.

With the first mold part 61 and second mold part 62 are engaging one another, the movable mold part 63 can be moved in direction A4. As a result, the pins 71 project downward, through the pin ports 62P into the first cavity 61C. The pins are thus disposed between the lateral mold sidewall 61L, and the medial mold sidewall 61M, as well as between the toe mold wall 61T and the heel mold wall 61H. The pins 71 also can be disposed opposite or above the mold bottom wall 61B. These pins also can project into the internal region 30 of the expanded material EM. Although shown as being disposed in the mass of unexpanded beads UXB in particular, the unexpanded interior beads UXB1, these pins 70 optionally can be located slightly above or distal from the unexpanded beads UXBI. In most cases, however, the pins project into a mass of the extendable material EM.

To expand the expandable material EM in the cavity 61C, the first fluid S1 and second fluid S2 are introduced into the cavity while the cavity is closed, with the first mold part 61 adjacent the second mold part 62. As mentioned above, and shown in FIG. 5, the pins 71 also are extended into the cavity to the extent as described above. With the pins so located in the first cavity 61C, the valves or control 69B can be actuated such that pressurized and optionally heated fluid from the pressurized vessel 69 can travel through conduits to the first ports 61P defined by the one or more mold walls. In particular, the first fluid S1 can be introduced through the ports, for example, defined by the lateral mold wall 61L, the medial wall mold wall 61M, the bottom mold wall 61B. The introduced fluid S1 can expand the exterior unexpanded beads UXBE in the exterior region 40. These beads can begin to expand and increase in dimension as they expand. Simultaneously or slightly thereafter, the valve or control 69A can be actuated such that pressurized and optionally heated fluid from the pressurized vessel 69 can travel through the conduits to the pins 71, while the pins are extended and in the internal cavity, the second fluid S2 can be introduced through the distal pin apertures and sidewall apertures of the respective pins into the internal region. The introduced fluid S2 can expand the interior unexpanded beads UXBI in the internal region 30. With this localized administration of the second fluid 52 in this internal region 30, that region can expand at the same, a lesser and/or greater amount than the exterior beads expand.

Optionally, the second fluid 52 and the first fluid S1 can be introduced simultaneously into the cavity, through the first ports and/or the pins. The valves and/or controls 69A and 69B can control administration of the first and second fluids. These first and second fluids also can come from the common pressurized vessel 69. Accordingly, the first and second fluids can be the same fluid. As an example, the first and second fluids can both be steam that is stored under pressure and at a temperature in the pressurized vessel 69. The second fluid S2 can be introduced into the first cavity 61C to the internal region 30 via the elongated pins 71. The second fluid 52 and the first fluid S1 both can come from the pressurized vessel 69. The first fluid and the second fluid can be at the pressure and temperature as noted above.

Figure 7:
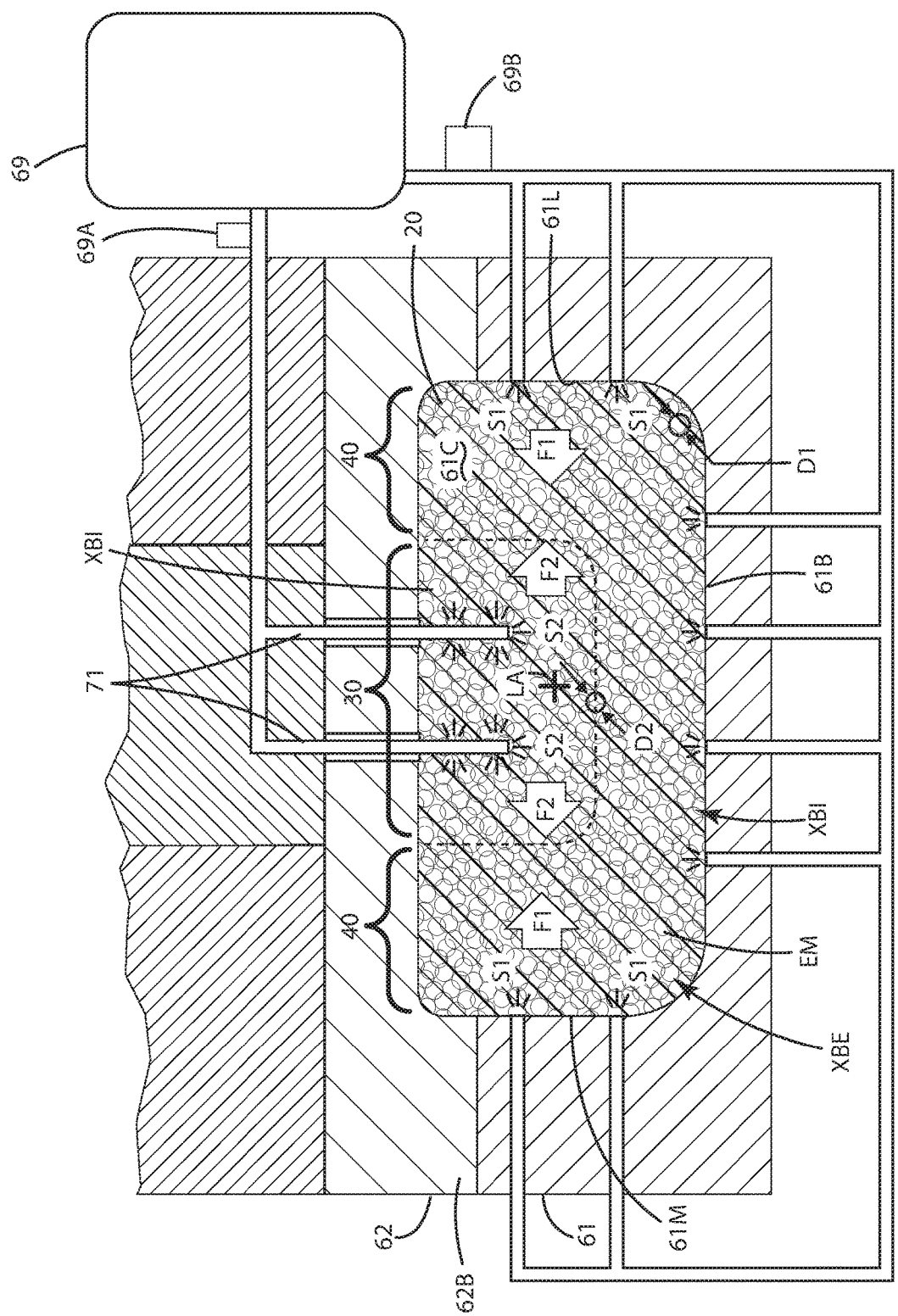
FIG. 7 is a section view of a mold used to manufacture the sole component, illustrating the elongated pins projecting into the closed first cavity.

As the expandable material EM expands, the associated exterior beads in exterior region 40 and interior beads in the internal region 30 correspondingly expand. They optionally can expand at the same rate, or different rates, with the elongated pins 71 playing a role in expanding the interior beads in the internal region 30 at the same or different rates as the exterior beads expand in the external region 40. As shown in FIG. 7, the first fluid S1 introduced into the cavity 61C expands the beads in the external regions 40 adjacent the mold walls and eventually produces an inwardly directed force F1. This inward force F1 is directed generally toward the center of the mold cavity or longitudinal axis as shown by the arrows. This force is generated by the exterior beads XBE as they expand. The second fluid S2, being emanated from the pins 71, also expands the unexpanded interior beads in the internal region to form expanded interior beads XBI which exerts an outward force F2, generally away from the center of the internal region 30 or longitudinal axis LA. The inward force F1 produced by the first fluid S1 from the walls of the mold counters the outward force F2 in a location that is generally between the lateral mold wall 61 and the medial mold wall 61M, as well as between the toe wall 61T and the heel mold wall 61H.

The first fluid S1 can be introduced through the first ports and the mold walls in the second fluid S2 can be introduced the elongated pins into the internal region of the expandable material EM to form the medial through sidewall 20M, the lateral sidewall 20L, the toe wall 20T, the heel wall 20H, the sole bottom wall 20B and the sole upper wall or surface 20U. Again, with the introduction of the first fluid S1 and the second fluid S2, the interior and exterior beads sufficiently expand such that those beads fill the cavity 61C.

Optionally, the cavity is in the form of the sole component. The cavity and the beads also can be void of any type of exterior skin, shell, coating or covering which otherwise circumferentiates the sole component. Thus, the sole component and the associated expandable materials do not have any exterior skin, shell or cover that envelops the sole component or the expandable material, or the beads themselves. The beads, in particular, the exterior expanding beads, can directly contact the walls of the mold within the first cavity 61C, without any further items being placed between the extendable material or the beads and the mold walls.

After the beads of the expandable material EM are sufficiently expanded in the internal region and the external region, the sole component 20 can be allowed to cure for a predetermined amount of time. This curing can occur in the first cavity or outside the first cavity. To access the cured sole component 20, the first mold part and second mold part can be moved away from one another to access the cavity.

Figure 8:
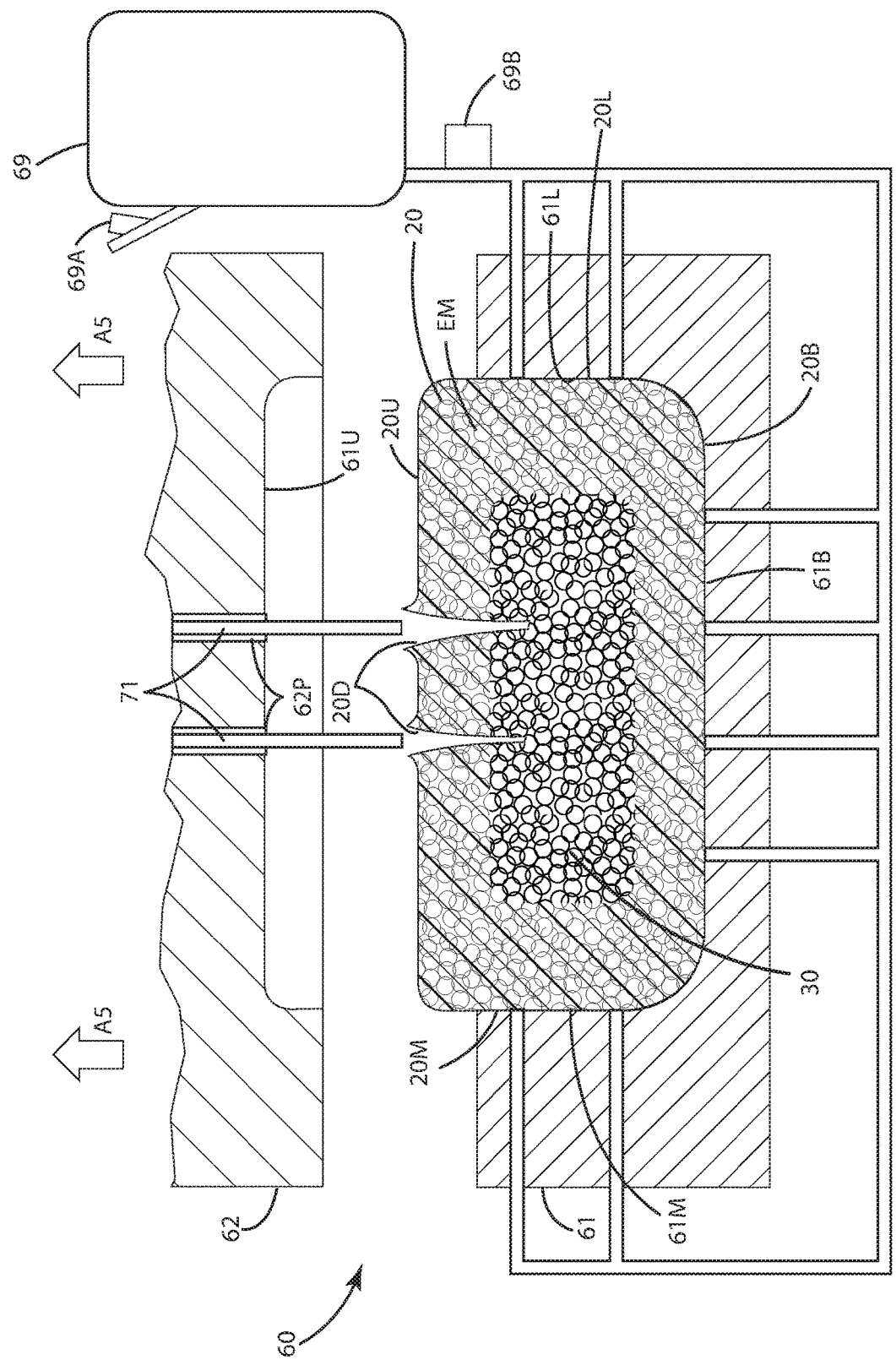
FIG. 8 is a section view of a mold used to manufacture the sole component, illustrating the elongated pins being retracted out of the sole component to leave remnant deformations in the sole upper wall.

Before, after or as the sole component 20 cures, the pins 71 can be removed from the sole component 20. For example, as shown in FIG. 8, the second mold part 62 can be moved in direction A5 away from the first mold 61. The pins 71 can exit out of the sole component 20 through the sole upper wall 20U. Although shown with the pins 71 still projecting from the ports 62P, optionally, although not shown, the pins can be withdrawn while the second mold part 62 remains adjacent the first mold part 61, and the upper mold surface 61U remains adjacent the upper sole wall 20U.

With reference to FIG. 8, the pins 71 again are removed from the upper sole wall 20U. As the pins are removed from the sole component 20, they are withdrawn or retracted out from the sole upper wall 20U. As this occurs, the pins produce remnant deformations 20D in the upper sole wall 20U. These remnant deformations can be in the form of negative spaces, recesses, holes apertures, projections, doughnut shaped recesses or other deformations in the upper sole wall 20U. These remnant deformations 20D form where the elongated pins were once located. As described below, these remnant deformations can be concealed.

After the sole component is cured to form a cured sole component, it can include the various medial sole wall, lateral sole wall, heel sole wall, tow wall as shown in FIG. 10. There, the internal region 30 also is illustrated, and located inward from the external region 40. In the internal region 30, where the pins were once located, the plurality of remnant deformations 20D are formed. Where the sole component 20 is in the form of a midsole, as shown in FIG. 11, that midsole 20 can be joined with the outsole 50 via adhesives, cement or other fastening elements. In particular, the bottom sole wall 20B of the midsole can be adhered to the upper surface 50U of the outsole 50. The upper 17 can be joined with the midsole 20 as well. To do so, an adhesive can be applied to the upper sole wall 20U, optionally over the remnant deformations 20D. The Strobel board 17SB can then be placed over the upper sole wall 20U. When it is so placed, the remnant deformations 20D are concealed from view.

Optionally, in some applications, the pins can be built into the mold such that they are introduced and returned from other mold walls, rather than the upper mold wall. In such a case, the remnant deformations may be formed in a medial, lateral, heel, or toe walls of the sole component 20. In such a case, this remnant deformations may or may not be concealed. If they are concealed, a covering, sheet or other material can be disposed over the respective lateral, medial, heel, and toe walls. In yet other applications, where the pins are introduced through the bottom mold wall 61B into the cavity 61C, any remnant deformations formed by such pins being withdrawn from the midsole from the bottom 20B can be covered by the outsole 50.

As noted above, the pins can allow a fluid, such as steam, to be selectively introduced in an internal region of the sole component. Accordingly, interior beads in that internal region can be expanded a particular amount and to a particular density and dimension. For example, the beads in the internal region 30 can be expanded to the same amount, to a lesser amount or to a greater amount than the beads in an external region. As shown in FIGS. 7 and 9, the expanded exterior beads XBE in the external region 40 are expanded in a heel region 60 of the sole component 20 to a dimension D1 that is substantially the same as the dimension D2 of the interior expanded beads XBI in the internal region 30. The expanded interior beads in the internal region 30 thus can have a density N1 that is substantially equal to the density N2 of expanded beads in the external region 40. It is to be noted as well that the beads expanded in the internal region 30 also can have a density that is substantially equal to the density of the remainder of the formed heel region 16 of the sole component, the arch region 14 of the sole component and/or the forefoot region 12 of the sole component. Optionally, the beads throughout the entire length L and width W of the sole component can be similarly expanded so that the density and cushioning attributes are substantially similar throughout, as are the dimensions of the expanded beads. In turn, this can provide substantially uniform cushioning properties of the sole component 20.

Figure 12:
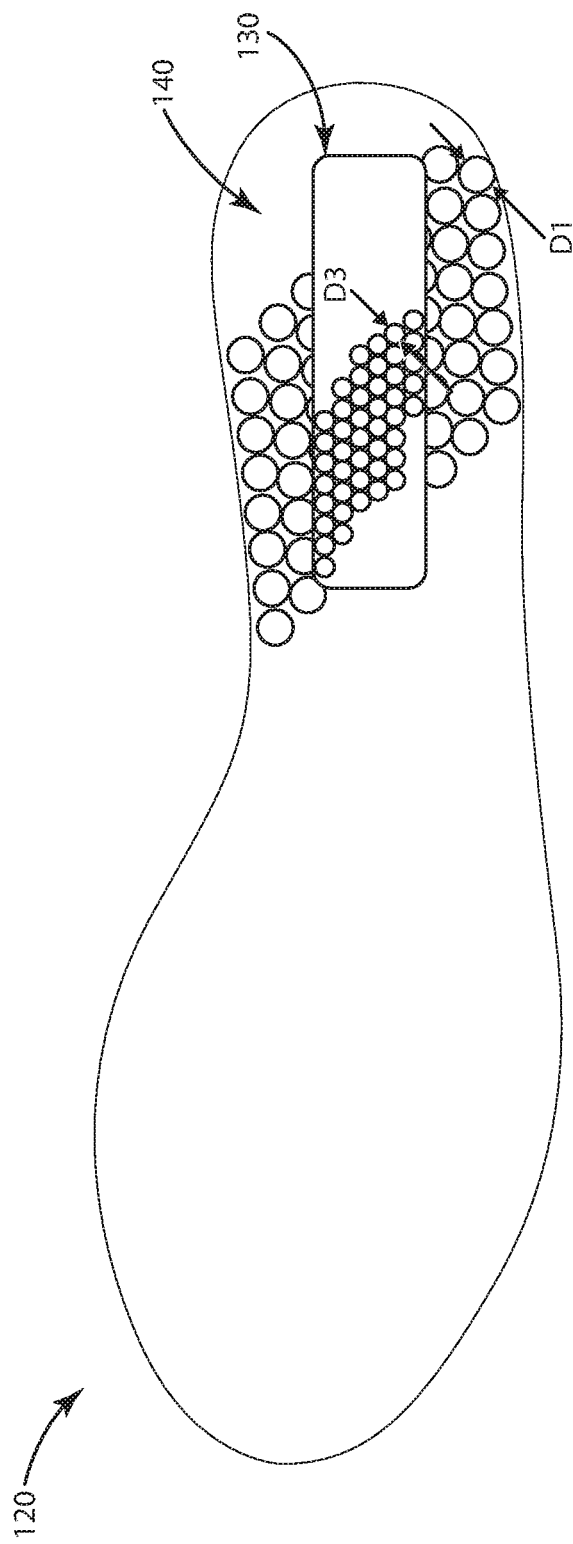
FIG. 12 is a top view of the sole component illustrating an internal region with interior beads expanded less than exterior beads with the method herein.

Optionally, the method provides a way to selectively expand the beads in an internal region of the sole component. For example, as shown in FIG. 12, the sole component 120 can include an internal region 130 and an external region 140. This sole component 120 can be formed in a mold similar to the mold 60 described above with pins that introduce fluid into the internal region 130 to expand interior beads therein. However, with this embodiment, the method can include introducing a second fluid 52 through the pins at a different rate, pressure and/or temperature than the first fluid S1. As a result, the interior beads in the internal region 130 expand less than the beads in the external region 140. Thus the beads in the internal region 130 have a smaller dimension D3 than the dimension D1 of the beads in the exterior region 140. As a result, the beads in the internal region 130 can be more dense through beads in the external region 140. As a result, this can increase rigidity and reduce cushion and/or compression of that internal region 130. In some cases, the internal region 130 can be moved around relative to the sole component to provide increased density in particular locations. For example, that internal region 130 can be moved into the arch and/or the forefoot to add torsional rigidity and/or decreased flexibility in those regions.

Figure 13:
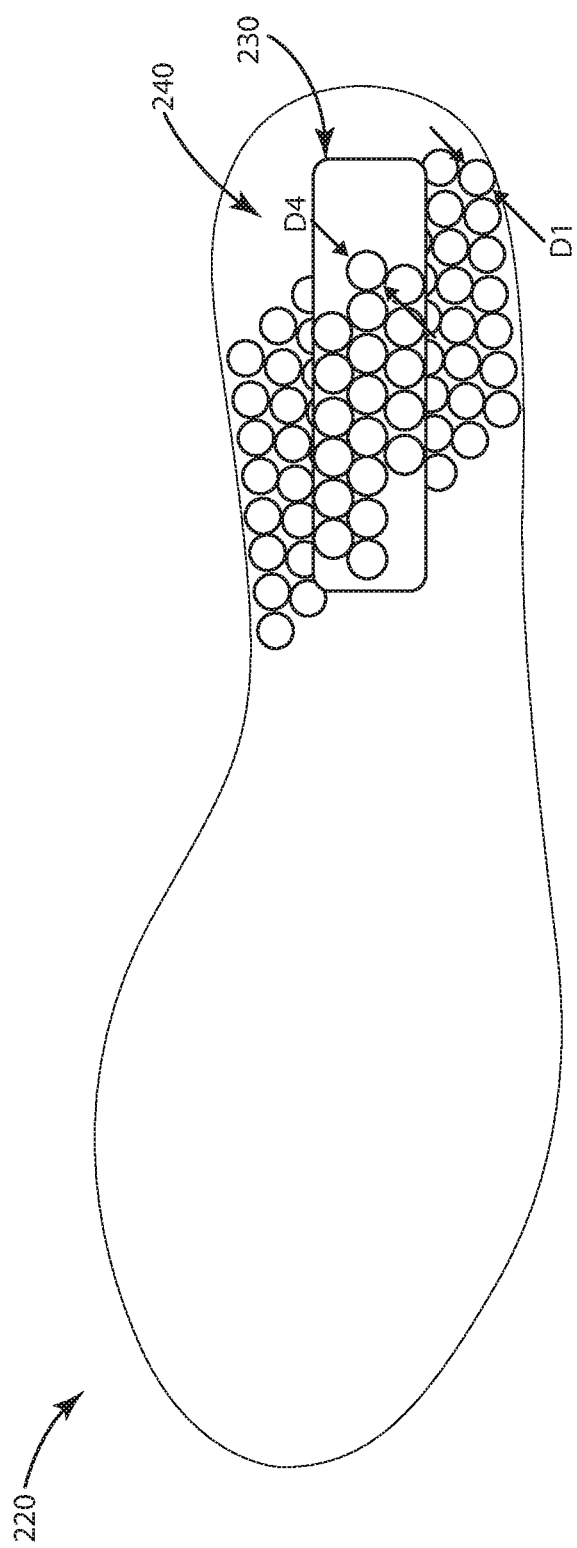
FIG. 13 is a top view of the sole component illustrating an internal region with interior beads expanded more than exterior beads with the method herein.

Another example of selective expansion of beads in an internal region is illustrated in FIG. 13. There, the sole component 220 can be formed in a mold similar to the mold 60 described above with pins that introduce fluid S2 into the internal region 230 to expand interior beads therein. However, with this embodiment, the method can include introducing a second fluid 52 at a different rate, pressure and/or temperature than the first fluid S1. As a result, the interior beads in the internal region 230 expand more or to a greater degree than the beads in the external region 240. Thus, the beads in the internal region 230 can have a greater dimension D4 than the dimension D1 of the beads in the exterior region 240. As a result, the beads in the internal region 230 can be less dense and optionally less in number than the construction shown in FIG. 12. As a result, this can reduce rigidity and increase cushion and/or compressibility of that internal region 230. In some cases, the internal region 230 can be moved around relative to the sole component to provide increased cushioning in particular locations.

The various components and features of the embodiments herein, for example, the upper, sole or other footwear portions, can take on a variety of aesthetic forms, shapes and sizes. Although a particular component or feature can have a function, that feature can be expressed in different aesthetic manners to form an artistic design and/or purely ornamental design.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

In addition, when a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to," or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A method of manufacturing a footwear sole component comprising:
   providing a first mold part defining a first cavity bounded by a first mold wall, the first mold wall defining a plurality of first ports in connection with a supply of fluid, the first mold wall including at least a lateral mold wall, a medial mold wall, a toe mold wall, a heel mold wall, and a bottom mold wall;
   introducing an expandable material including a plurality of unexpanded beads into the first cavity such that a plurality of exterior unexpanded beads engage the first mold wall, with a plurality of interior unexpanded beads being distal from the first mold wall in an internal region of the first cavity;
   placing a second mold part adjacent the first mold part to close the first cavity, the second mold part including a base, the base defining a plurality of pin ports,
   projecting a plurality of elongated pins through the plurality of pin ports into the first cavity between the lateral mold wall and the medial mold wall, between the toe mold wall and the heel mold wall, and opposite the bottom mold wall, the plurality of elongated pins projecting into the internal region;
   introducing a first fluid into the first cavity through the plurality of first ports defined by the first mold wall to expand the plurality of exterior unexpanded beads, the first fluid producing an inward force toward the internal region;
   introducing a second fluid into the internal region via the plurality of elongated pins such that second fluid from the plurality of elongated pins expands the plurality of interior unexpanded beads in the internal region and exerts an outward force, away from the internal region, while the inward force produced by the first fluid counters the outward force;
   forming with a plurality of expanded exterior beads a lateral sole wall, a medial sole wall, a toe sole wall, a heel sole wall, a bottom sole wall and an upper sole wall, configured to engage a Strobel board of an upper, of a sole component, the plurality of elongated pins extending through the upper sole wall;
   removing the plurality of elongated pins out of the upper sole wall such that the plurality of elongated pins exit out of the sole component through the upper sole wall;
   curing the sole component in the first cavity; and
   moving the second mold part away from the first mold part so that the sole component can be removed from the first cavity.

2. The method of claim 1,
   wherein each of the plurality of elongated pins includes a pin end and a pin sidewall,
   wherein the pin end includes a distal aperture,
   wherein the pin sidewall defines a plurality of pin sidewall apertures,
   wherein the second fluid exits each pin via the distal aperture and the plurality of pin sidewall apertures.

3. The method of claim 2,
   wherein the plurality of interior unexpanded beads expand due to the second fluid, which is in the form of steam, engaging the interior unexpanded beads as the second fluid exits the distal aperture and the plurality of pin sidewall apertures.

4. The method of claim 3,
   wherein each of the plurality of elongated pins extends into the first cavity at least 25% of a thickness of the first cavity during the second fluid introducing step.

5. The method of claim 1,
   wherein the internal region is disposed in an arch region of the sole component,
   wherein the plurality of interior unexpanded beads are expanded to the same extent as the plurality of expanded exterior beads after the curing step.

6. The method of claim 1,
   wherein each of the plurality of elongated pins is a hollow tube,
   wherein each hollow tube is in common fluid communication with a pressurized vessel of the second fluid which is in the form of steam, wherein the second fluid travels through each hollow tube at a common pressure and temperature during the second fluid introducing step.

7. The method of claim 6, wherein each of the plurality of first ports is in common fluid communication with the pressurized vessel of the second fluid.

8. The method of claim 1, wherein the first fluid and the second fluid are each steam that is at a pressure of at least 3 bar, wherein the first fluid and the second fluid are each at a temperature of at least 100° C.

9. The method of claim 8, wherein after the plurality of elongated pins are retracted from the sole upper wall, the sole upper wall defines a plurality of remnant deformations where the elongated pins were once located, wherein after the curing step, the Strobel board is placed over the sole upper wall to conceal the remnant deformations.

10. The method of claim 1, wherein the plurality of first ports are defined in the lateral mold wall and the medial mold wall, wherein the plurality of elongated pins include a plurality of sidewall apertures, wherein the plurality of sidewall apertures point toward the lateral mold wall and the medial mold wall during the second fluid introducing step.

11. The method of claim 10, wherein the cured sole component is a midsole having a width extending from the lateral sole wall to the medial sole wall and a length extending from the toe sole wall to the heel sole wall, wherein the midsole is joined with an outsole with adhesive, wherein the midsole includes a forefoot region, an arch region and a heel region, wherein the plurality of elongated pins are withdrawn from the sole upper wall in the heel region along a longitudinal axis of the midsole.

12. The method of claim 1 comprising: expanding the plurality of interior unexpanded beads in the internal region to form a heel region of the sole component with a density substantially equal to a density of a forefoot region of the sole component.

13. The method of claim 1 comprising: retracting the plurality of elongated pins out of the upper sole wall in a heel region of the sole component, wherein the heel region has a heel thickness of at least 20 mm, wherein each of the plurality of elongated pins projects into the first cavity less than 20 mm.

14. The method of claim 13, wherein after the plurality of elongated pins are retracted from the upper sole wall in the heel region, the upper sole wall defines a plurality of remnant deformations where the plurality of elongated pins were once located in the heel region, wherein after the curing step, the Strobel board is placed over the upper sole wall to conceal the remnant deformations.

15. The method of claim 1, wherein the plurality of first ports comprise:
a first plurality of first ports defined in the lateral mold wall, the first fluid introduced through the first plurality of first ports producing a first inward force toward the internal region; and
a second plurality of first ports defined in the medial mold wall, the medial mold wall disposed opposite the lateral mold wall and the first fluid introduced through the second plurality of first ports producing a second inward force toward the internal region opposing the first inward force; and
wherein the outward force exerted away from the internal region is countered by the first inward force and the second inward force at a location that is between the lateral mold wall and the medial mold wall.

16. A method of manufacturing a footwear sole component comprising:
providing a first mold part defining a first cavity bounded by a first mold wall, the first mold wall defining a plurality of first ports, the first cavity including a lateral mold wall, a medial mold wall, a toe mold wall, a heel mold wall and a bottom mold wall, the first cavity having therein an expandable material including a plurality of unexpanded beads;
providing a second mold part that closes the first cavity;
projecting a plurality of elongated pins from the second mold part into the first cavity between the lateral mold wall and the medial mold wall, and between the toe mold wall and the heel mold wall;
introducing a first fluid into the first cavity through the plurality of first ports;
introducing a second fluid into the first cavity simultaneously with the first fluid via the plurality of elongated pins;
expanding the plurality of unexpanded beads with the first fluid and the second fluid to produce a plurality of expanded beads that form a lateral sole wall, a medial sole wall, a toe sole wall, a heel sole wall, a bottom sole wall and an upper sole wall of a sole component;
removing the plurality of elongated pins out of the first cavity;
curing the sole component in the first cavity to form a cured sole component; and
removing the cured sole component from the first mold cavity.

17. The method of claim 16, wherein the plurality of elongated pins are retracted from the upper sole wall in a heel region of the cured sole component so that the upper sole wall defines a plurality of remnant recesses where the plurality of elongated pins were once located in the heel region, wherein after the curing step, a Strobel board is placed over the upper sole wall to conceal the remnant recesses.

18. The method of claim 17, wherein the heel region has a heel thickness of at least 20 mm, wherein each of the plurality of elongated pins projects into the first cavity less than 20 mm before the retracting step.

19. The method of claim 16, wherein the plurality of first ports are defined in the lateral mold wall and the medial mold wall, wherein the plurality of elongated pins include a plurality of sidewall apertures, wherein the plurality of sidewall apertures point toward the lateral mold wall and the medial mold wall during the second fluid introducing step.

20. A method of manufacturing a footwear sole component comprising:
providing a first mold part defining a first cavity bounded by a first mold wall, the first mold wall defining a plurality of first ports, the first mold wall including at least a lateral mold wall, a medial mold wall, a toe mold wall, a heel mold wall and a bottom mold wall, the first cavity having therein an expandable material including a plurality of unexpanded beads in an internal region;

projecting a plurality of elongated pins into the first cavity, the elongated pins projecting from a second mold part that closes the first cavity;

introducing a first fluid into the first cavity through the plurality of first ports;

introducing a second fluid into the first cavity via the plurality of elongated pins;

expanding the plurality of unexpanded beads with the first fluid and the second fluid to produce a plurality of expanded beads that form a sole component having at least one of a lateral sole wall, a medial sole wall, a toe sole wall, a heel sole wall, a bottom sole wall and an upper sole wall;

curing the sole component in the first cavity to form a cured sole component; and removing the cured sole component from the first cavity.

\* \* \* \* \*